Patented July 14, 1931

1,814,515

UNITED STATES PATENT OFFICE

BERTRAM LAMBERT, OF OXFORD, ENGLAND, ASSIGNOR TO NATIONAL PROCESSES LIMITED, OF LONDON, ENGLAND, AN ENGLISH LIMITED LIABILITY COMPANY

MANUFACTURE OF MATERIALS OF THE NATURE OF CATALYSTS FOR THE OXIDATION OF OXIDIZABLE GASES IN ADMIXTURE WITH AIR OR OXYGEN

No Drawing. Application filed August 23, 1928, Serial No. 301,696, and in Great Britain September 6, 1927.

This invention relates to improvements in the manufacture of materials of the nature of catalysts particularly materials suitable for employment in the oxidation of gases in admixture with air or oxygen, an object of the invention being the production of solid materials preferably in the form of hard granules having a large available surface and allowing of the ready passage of gases or vapours through them. Materials manufactured in accordance with this invention possess substantial advantages as oxidizing media for the oxidation of gases (such for instance as sulphur dioxide) passed in admixture with sufficient air or oxygen over the said materials in a heated state in that they can be used at such temperatures that the oxidizing power of the materials can be continuously exerted over long periods of time.

It is well known that chromium hydroxide (hydrated chromium oxide) will absorb oxygen when heated under pressure at a temperature of about 400° C. but only a small proportion of the chromium which exists in the trivalent state is thereby converted into higher oxides of chromium in which the valency is higher than three even if the heating be carried out in oxygen under a pressure as high as 12 (twelve) atmospheres.

It is also known that when hydrated chromium oxide is mixed with such basic oxides as $Ag_2O$, MgO, ZnO, CdO, and PbO, and heated to 460° C. in oxygen at a pressure of 12 (twelve) atmospheres, a considerable proportion of the trivalent chromium is converted into higher oxides of chromium.

The present invention primarily consists in the production of hydrated chromium oxide such that when heated in air at the ordinary atmospheric pressure to a temperature of 350° C. to 400° C. it will absorb increased quantities of oxygen and show an increased proportional conversion of trivalent chromium into its higher oxides. This is achieved according to the present invention by precipitating chromium hydroxide in the form of hydrogel and causing or permitting the latter to adsorb an insoluble or slightly soluble base or bases. Materials so manufactured possess great powers and advantages as catalysts or oxidizing media for the oxidation of oxidizable gases (such, for example, as sulphur dioxide) when these gases are passed, in admixture with sufficient air or oxygen over them. If the temperature of such materials be maintained at a suitable value, above 350° C., and sufficient air or oxygen be used in the admixture, the materials are capable of continuous use as oxidizing media over long periods of time.

We have found that when a cold aqueous solution containing 10% by weight of a soluble chromium salt (such, for example, as chromium nitrate or chloride) is added, in equivalent quantity, slowly, and with stirring, to a cold aqueous solution of caustic soda containing 1 part by weight of NaOH to each 2 parts by weight of water, chromium hydroxide is eventually precipitated in the form of a hydrogel. Precipitation may not begin until some time has elapsed after the solutions have been mixed. The process may be carried out though not so readily without stirring in which case the chromium hydroxide may appear in the form of a jelly.

If the precipitated hydrogel of chromium hydroxide thus prepared is washed free from soluble salts by distilled water and then filtered and the product allowed to dry slowly in air, at the ordinary temperature, the material undergoes marked shrinkage and, when the drying under these conditions is complete, a hard, brittle solid is obtained which shows a bright lustrous surface, after fracture, and which in thin layers is transparent. At this stage of the drying it is important that the temperature should not be raised.

Further drying in a current of air at a higher temperature (say 100° C.) causes the loss of more water and the product undergoes further shrinkage and becomes harder. If, when the water content has been reduced to about 10% the product be heated to a temperature of about 350° C. in a current of air, still more water is removed although the material may still contain 4% to 5% of water associated with the chromium oxide calculated as $Cr_2O_3$. This water can only be removed by heating for long periods at much higher temperatures. The material obtained after heating at a temperature of about 350° C. in air has, in a marked degree, the power of adsorbing considerable quantities of condensible gases and vapours. It contains a small proportion of the chromium in a higher state of oxidation than trivalent but it has no marked advantages as a catalyst or oxidizing medium.

When however, chromium hydroxide hydrogel is precipitated as described above and washed free from soluble salts, the wet hydrogel has, in a very marked degree, the power of adsorbing insoluble or slightly soluble bases when placed in contact with aqueous solutions of the salts of these bases. If, for example, the wet chromium hydroxide hydrogel be mixed with a dilute solution of the acetate of calcium, or magnesium, or nickel, or cobalt, or manganese, or zinc and then allowed to settle, the supernatant liquid is found, after a short time, to contain little or none of the base in solution. It is thus possible to adsorb in the precipitated chromium hydroxide hydrogel an insoluble or slightly soluble base or a mixture of insoluble or slightly soluble bases and washing with water does not remove these adsorbed bases.

If now the chromium hydroxide hydrogel, containing an adsorbed base, or bases, be washed, filtered and dried as described above, the product may not be markedly different in appearance from the simple dehydrated chromium oxide gel even if it contains as much as 20% of its weight of adsorbed base.

But if the material be heated for a sufficient time in a current of air at a temperature of about 350° to 400° C. the material discloses in addition to high absorptive properties great powers and advantages as a catalyst or oxidizing medium for the oxidation of oxidizable gases (such, for example, as sulphur dioxide) when passed, in admixture with sufficient air or oxygen, over the heated material even at atmospheric pressure.

When a mixture of sulphur dioxide and air is passed over these materials at a temperature of about 500° C. oxidation to sulphur trioxide occurs and progressively increases until a continuous high percentage conversion is obtained.

The invention further includes the improved material prepared in the manner herein described.

What I claim is:—

1. In the manufacture of catalytic materials, for the oxidation of oxidizable gases in the presence of oxygen, the step of causing a chromium hydrogel to adsorb at least one slightly soluble base.

2. A process for the manufacture of catalytic materials for the oxidation of oxidizable gases in the presence of oxygen, comprising preparing chromium hydroxide in the form of hydrogel, washing the same free from soluble salts and thereafter causing it to adsorb at least one slightly soluble base.

3. A process for the manufacture of catalytic material for the oxidation of oxidizable gases in the presence of oxygen, comprising precipitating chromium hydroxide in the form of a hydrogel, mixing into said hydrogel a solution of a salt of at least one slightly soluble base so as to cause the said hydrogel to adsorb said base washing, filtering if necessary, and finally drying said hydrogel containing the adsorbed base or bases.

4. A process for the manufacture of catalytic material for the oxidation of oxidizable gases in the presence of oxygen comprising preparing a chromium hydroxide hydrogel, washing same free from soluble salts bringing the wet hydrogel into contact with an aqueous solution of a salt of at least one slightly soluble base to cause the hydrogel to adsorb said base, washing, filtering if necessary, and finally heating the hydrogel containing such adsorbed base in a current of air and then drying same at a temperature of from 350° to 400° C.

BERTRAM LAMBERT.

CERTIFICATE OF CORRECTION.

Patent No. 1,814,515.  Granted July 14, 1931, to

BERTRAM LAMBERT.

It is hereby certified that error appears in the printed specification of the above numbered patent requiring correction as follows: Page 2, line 58, claim 1, after the word "chromium" insert the word hydroxide; same page, line 77, claim 3, strike out the words "or bases"; and that the said Letters Patent should be read with these corrections therein that the same may conform to the record of the case in the Patent Office.

Signed and sealed this 25th day of August, A. D. 1931.

(Seal)
M. J. Moore,
Acting Commissioner of Patents.